United States Patent [19]

Nilssen

[11] Patent Number: 4,954,754
[45] Date of Patent: Sep. 4, 1990

[54] CONTROLLED ELECTRONIC BALLAST

[76] Inventor: Ole K. Nilssen, Caesar Dr., Barrington, Ill. 60010

[21] Appl. No.: 189,399

[22] Filed: May 2, 1988

[51] Int. Cl.$^5$ ............... H05B 37/02; H05B 39/04; G05F 1/00
[52] U.S. Cl. .................... 315/219; 315/205; 315/209 R; 315/244; 315/208; 315/307; 315/297; 315/DIG. 7
[58] Field of Search .......... 315/244, DIG. 4, DIG. 7, 315/227 R, 209 R, 200 R, 205, 207, 208, 86, 307, 297, 246, 248, 278, 287, 219, 224

[56] References Cited

U.S. PATENT DOCUMENTS

| | | | |
|---|---|---|---|
| 4,060,752 | 11/1977 | Walker | 315/244 |
| 4,346,332 | 8/1982 | Walden | 315/244 |
| 4,388,561 | 6/1983 | Koshimura et al. | 315/224 |
| 4,395,659 | 7/1983 | Aoike et al. | 315/278 |
| 4,553,070 | 11/1985 | Sairanen et al. | 315/244 |
| 4,560,908 | 12/1985 | Stupp et al. | 315/219 |
| 4,647,817 | 3/1987 | Fähnrich et al. | 315/DIG. 7 |
| 4,701,671 | 10/1987 | Stupp et al. | 315/219 |

Primary Examiner—Eugene P. LaRoche
Assistant Examiner—Michael B. Shingleton

[57] ABSTRACT

A fluorescent lamp is connected in parallel with a resonant L-C circuit powered by a series-applied high frequency voltage from a self-oscillating inverter power supply. The frequency of the series-applied voltage is about 33 kHz during the brief initial period before the lamp ignites, but falls to about 30 kHz after the lamp has ignited. As a result, the detuning taking place in the L-C resonant circuit due to changing parallel-loading is compensated-for by correspondingly changing the frequency of the series-applied voltage. This detuning effect is particularly pronounced in situations where there is a large magnitude-ratio between the lamp's ignition voltage and its operating voltage.

8 Claims, 1 Drawing Sheet

CONTROLLED ELECTRONIC BALLAST

BACKGROUND OF THE INVENTION

1. Field of the Invention

The present invention relates to electronic ballasts for gas discharge lamps, particularly to ballasts wherein the load is powered by way of a series-excited parallel-loaded resonant L-C circuit.

2. Description of Prior Art

There are two predominant types of electronic ballasts for gas discharge lamps: (a) a first type may be referred-to as the parallel-resonant type and involves the use of a current-excited (i.e., parallel-excited) parallel-loaded resonant L-C circuit; and (b) a second type that may be referred-to as the series-resonant type and involves the use of a voltage-excited (i.e., series-excited) parallel-loaded resonant L-C circuit.

An example of the parallel-resonant type of electronic ballasts is described in U.S. Pat. No. 4,277,726 to Burke. An example of the series-resonant type of electronic ballasts is described in U.S. Pat. No. 4,538,095 to Nilssen.

Of these two types of electronic ballasts, the parallel-resonant type is conducive to yielding a stable easy-to-control self-oscillating inverter-type ballast; whereas the series-resonant type, although potentially simpler and more efficient, is harder to control in that it has a natural tendency to self-destruct in case the lamp load be removed and/or in case the phasing between applied voltage and resulting current were to become such that the current be leading.

To mitigate this tendency to self-destruct under no-load and/or special load conditions, various protection circuits have been developed, such as for instance described in U.S. Pat. No. 4,638,562 to Nilssen.

GENERAL PURPOSE OF THE PRESENT INVENTION

The general purpose of the present invention is that of providing a method for cost-effectively controlling and make more efficient the operation of a series-resonant electronic inverter-type ballast for fluorescent lamps.

SUMMARY OF THE INVENTION

Objects of the Invention

An object of the present invention is the provision of a cost-effective control arrangement for attaining proper operation of an electronic ballast wherein the gas discharge lamp load is powered by way of a series-excited predominantly parallel-loaded resonant L-C circuit.

Another object is that of providing effective compensation for the detuning that naturally occurs in a series-excited parallel-loaded tuned L-C circuit as a function of changes in the magnitude of the parallel-connected load.

These as well as other objects, features and advantages of the present invention will become apparent from the following description and claims.

Brief Description

A fluorescent lamp is parallel-connected with a resonant L-C circuit that is powered by a series-applied high frequency voltage from a self-oscillating inverter power supply. The frequency of the series-applied voltage is about 33 kHz during the brief initial period before the lamp ignites, but falls to about 30 kHz after the lamp has ignited. As a result, detuning taking place in the L-C resonant circuit due to changing parallel-loading is compensated-for by correspondingly changing the frequency of the series-applied voltage.

The natural resonance frequency of a series-excited parallel-loaded L-C circuit is a function of the nature of the parallel-connected load even if that load is purely resistive. For a high-resistance load impedance, such as represented by a fluorescent lamp prior to lamp ignition, the natural resonance frequency is at or near its maximum. For a lower-resitance load impedance, such as represented by a fluorescent lamp after lamp ignition, the natural resonance frequency is reduced—with the degree of reduction being effectively a function of the ratio between the magnitude of the lamp's ignition voltage and that of its operating voltage.

The effect of the indicated change in the natural resonance frequency—if such change were not compensated-for—would be that of operating with a particularly poor power factor either during the pre-ignition period or during the post-ignition period.

DESCRIPTION OF THE PREFERRED EMBODIMENT

Details of Construction

Figure 1:
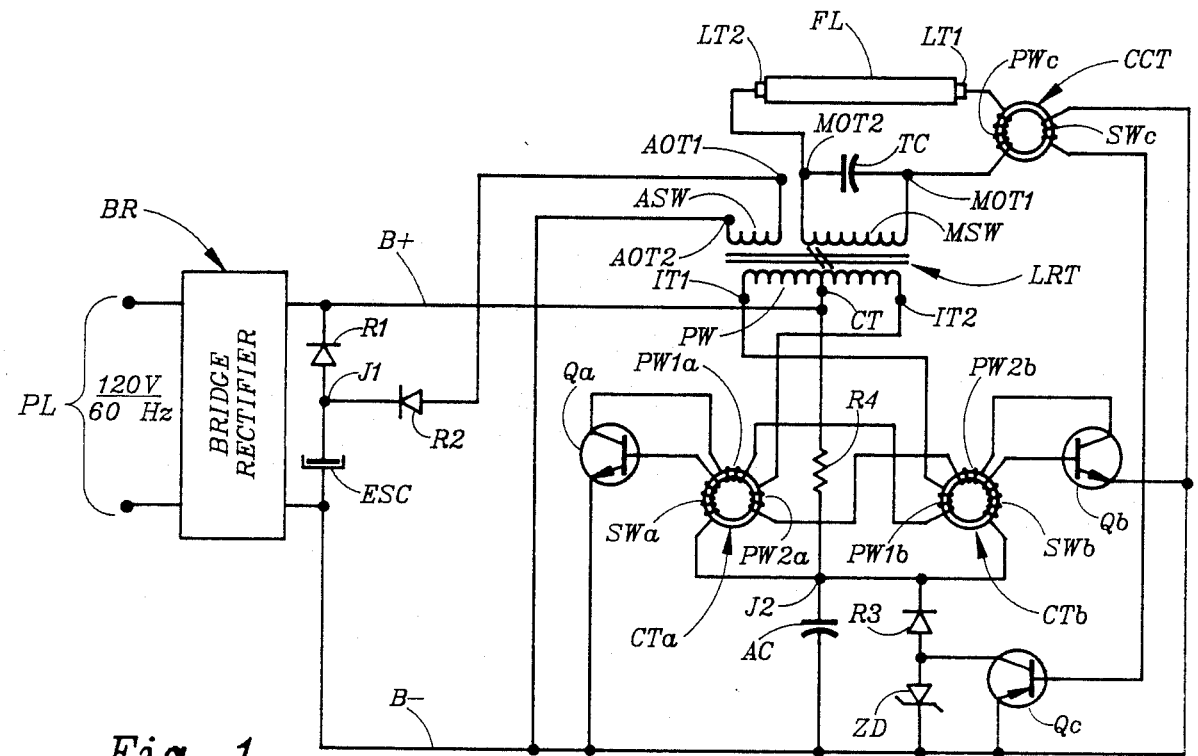
FIG. 1 diagrammatically illustrates the basic circuit arrangement of the invention in its preferred embodiment.

FIG. 1 schematically illustrates a basic version of the preferred embodiment of the invention.

In FIG. 1, 120Volt/60Hz power line voltage from an ordinary electric utility power line PL is provided to the AC power input terminals of a bridge rectifier BR, the DC output from which is applied between a B+ bus and a B− bus.

An energy-storing capacitor is connected between the B− bus and a junction J1; a rectifier R1 is connected with its anode to junction J1 and with its cathode to the B+ Bus; and a rectifier R2 is connected with its cathode to junction J1 and with its anode to an auxiliary output terminal AOT1 of an auxiliary secondary winding ASW on a leakage reactance transformer LRT. Auxiliary secondary winding ASW has another auxiliary output terminal AOT2, which is connected with the B− bus.

A first switching transistor Qa is connected with its emitter to the B− bus and with its collector to an input terminal IT1 of a primary winding PW of transformer LRT by way of primary windings PW1a and PW1b of current transformers CTa and CTb, respectively. The base of transistor Qa is connected with a junction J2 by way of secondary winding SWa on current transformer CTa.

A second switching transistor Qb is connected with its emitter to the B− bus and with its collector to an input terminal IT2 of primary winding PW of transformer LRT by way of primary windings PW2a and PW2b of current transformers CTa and CTb, respectively. The base of transistor Qb is connected with a junction J2 by way of secondary winding SWb on current transformer CTb.

Primary winding PW of transformer LRT has a center-tap CT connected with the B+ bus. A bias resistor R4 is connected between center-tap CT and junction J2.

An auxiliary capacitor AC is connected between junction J2 and the B— bus. A rectifier R3 is connected with its cathode to junction J2 and with its anode to the anode of a Zener diode ZD. The cathode of Zener diode ZD is connected with the B— bus.

The emitter and collector of a control transistor Qc are respectively connected with the B— bus and the anode of Zener diode ZD. The base of transistor Qc is connected with the B— bus by way of a secondary winding SWc of a control current transformer CCT.

A primary winding PWc of transformer CCT is connected between a first main output terminal MOT1 of a main secondary winding MSW, and a first lamp terminal LT1 of fluorescent lamp FL. A second lamp terminal LT2 is connected with a second main output terminal MOT2. A tank capacitor TC is connected between main output terminals MOT1 and MOT2.

Details of Operation

Figure 2:
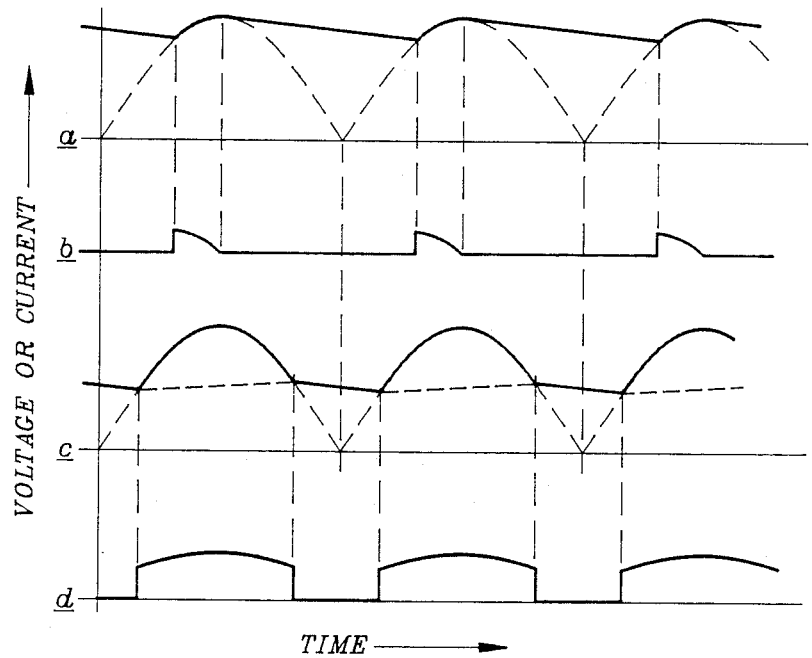
FIG. 2 depicts some of the voltage and current waveforms associated with the circuit arrangement of FIG. 1.

The general operation of the inverter circuit arrangement schematically illustrated by FIG. 1 is described in U.S. Pat. No. 4,307,353 to Nilssen. More specifically, its operation may best be explained with reference to the voltage/current waveforms of FIG. 2.

FIG. 2a depicts the magnitude of the B+ voltage for a situation when no significant load current is drawn from main output terminals MOT1/MOT2; which is to say: when the fluorescent lamp is either not connected or not yet ignited.

The phantom waveform in FIG. 2a refers to a non-filtered full-wave-rectified 120Volt/60Hz power line voltage.

FIG. 2b depicts the current drawn from the power line during the condition depicted by FIG. 2a.

FIG. 2c depicts the magnitude of the B+ voltage for the situation when a normal amount of load current is drawn from main output terminals MOT1/MOT2; which is to say: when the fluorescet lamp is operating normally.

FIG. 2d depicts the current drawn from the power line during the condition depicted by FIG. 2c.

In the circuit of FIG. 1, leakage reactance transformer LRT is of such nature as to exhibit a substantial primary-to-secondary leakage inductance; which means that its main secondary winding MSW exhibits an internal inductance operative to manifestly limit the magnitude of any current available from main output terminals MOT1/MOT2.

The internal inductance of main secondary winding MSW is tuned with tank capacitor TC. The tuning is so arranged as to be substantially resonant at the inverter's oscillation frequency as it prevails when no load current flows from main output terminals MOT1/MOT2—such as before the fluorescent lamp ignites. Nominally, this oscillation frequency is 33 kHz.

With no load current flowing from the MOT1/MOT2 terminals, the magnitude of the high-frequency voltage developing across the tank capacitor will, by virtue of so-called Q-multiplication, increase until manifestly limited. In instant situation, manifest magnitude limitation is accomplished by way of auxiliary secondary winding ASW; which auxiliary secondary winding is tightly coupled with the main secondary winding.

Thus, the magnitude of the high-frequency voltage present across the AOT1/AOT2 terminals will be proportional to that of the voltage across the MOT1/MOT2 terminals.

The high-frequency output voltage provided at the AOT1/AOT2 terminals is rectified and the resulting unidirectional current is applied to energy-storing capacitor ESC.

Thus, the magnitude of the DC voltage present across this energy-storing capacitor constitutes a manifest limit on the magnitude to which the high-frequency voltage across the AOT1/AOT2 terminals can grow. Proportionally, it likewise represents a manifest limit on the magnitude to which the high-frequency voltage across the MOT1/MOT2 terminals can grow.

Of course, when being charged from the AOT1/AOT2 terminals, the magnitude of the DC voltage across energy-storing capacitor ESC may grow. However, the magnitude of this DC voltage can obviously not increase past the peak magnitude of the full-wave-rectified power line voltage: which therefore constitutes the ultimate manifest magnitude limitation represented by energy-storing capacitor ESC.

Thus, prior to lamp ignition, the magnitude of the high-frequency voltage provided at the MOT1/MOT2 terminals will increase to a certain level proportional to the peak magnitude of the power line voltage; and it will remain at that level until the MOT1/MOT2 terminals get loaded.

During this pre-ignition period, the magnitude of the DC voltage between the B— bus and the B+ bus will be as indicated by FIG. 2a; which DC voltage will be substantially the same as that prevailing across energy-storing capacitor ESC. The corresponding current drawn from the power line will be as indicated by FIG. 2b.

While the circuit arrangement of FIG. 1 exists in the pre-ignition mode, the inverter itself provides its maximum output power; which output power is applied, by way of leakage reactance transformer LRT and rectifier means R2, in the form of unidirectional current to energy-storing capacitor ESC; wherefrom, in turn, this output power is re-supplied to the inverter in the form of its DC input power.

To minimize power consumption during the pre-ignition mode —which might prevail for extensive periods of time in case of a non-operative or non-connected lamp—it is important that the inverter provide its high-frequency output power with a high degree of efficiency. Such a high degree of efficiency is possible by making sure that the inverter provides this output power at a high power factor; which high power factor results when the load circuit operates at or near natural resonance of the parallel-loaded L-C circuit consisting of tank capacitor TC and the internal inductance of main secondary winding MSW.

The frequency of the inverter's oscillation is determined in significant part by the magnitude of the DC bias voltage present at junction J2; which bias voltage, in turn, is determined by the voltage-limiting means connected between junction J2 and the B— bus, namely rectifier R3 and Zener diode ZD. Thus, Zener diode was chosen such as to provide for a bias voltage at junction J2 operative to provide for proper resonant operation of the load circuit during the pre-ignition period.

During the pre-ignition period, the fluorescent lamp is subjected to the high-frequency voltage provided between the MOT1/MOT2 terminals. The magnitude of this voltage should be such as to provide for proper lamp ignition; and such proper magnitude is attained by suitably proportioning the turns-ratio between the main secondary winding and the auxiliary secondary winding—taking the peak magnitude of the power line voltage into account.

After having been subjected to an ignition voltage of proper magnitude for but a few milli-seconds, the fluorescent lamp will ignite. As a direct consequence of lamp ignition, the magnitude of the high-frequency voltage across the lamp will diminish to whatever level is associated with the lamp's operating characteristics; which level may be about half that of the level required for lamp ignition.

In other words, after lamp ignition, the magnitude of the high-frequency voltage present across the MOT1/MOT2 terminals decreases by a substantial factor; which is equivalent to a correspondingly decreased effective load impedance.

Also, after lamp ignition, lamp current will flow; which means that high-frequency current will flow through the primary winding of control current transformer CCT. As a result, corresponding high-frequency current will be provided from secondary winding SWc; which high-frequency current will intermittently cause control transistor Qc to become fully conductive. In turn, the intermittently conducting control transistor will cause the magnitude of the DC voltage at junction J2 to decrease, thereby to cause the inverter's oscillation frequency to decrease.

Thus, after lamp ignition, inverter frequency will decrease —with the amount of decrease so arranged that the series-excited parallel-loaded L-C load circuit will remain substantially in natural resonance with the inverter's high-frequency output voltage.

With the fluorescent lamp in operation, the magnitude of the high-frequency voltage present across the MOT1/MOT2 terminals will now be mainly limited by the circuit loading represented by the lamp: and this magnitude will be about half of the magnitude that prevailed during the pre-ignition period. As a consequence, the magnitude of the DC voltage across energy-storing capacitor ESC will stabilize at about half the peak magnitude of the power line voltage: which means that DC power to the inverter will be supplied directly from the power line whenever the absolute instantaneous magnitude of the power line voltage is larger than about half of its peak absolute magnitude. At other times, however, DC power to the inverter will be supplied from the energy-storing capacitor.

Thus, with the fluorescent lamp in normal operation, the DC voltage present between the B− bus and the B+ bus will be as indicated by FIG. 2c. The current correspondingly drawn from the power line will be as indicated by FIG. 2d; which current is of such waveshape as to cause the power drawn from the power line to be drawn with the relatively high power factor of 90% or so.

Additional Comments (a) To simplify the presentation of the essence of instant invention, the ballast circuit of FIG. 1 is shown without provisions for external cathode heating. However, cathode heating —as normally required with so-called Rapid Start fluorescent lamps—can readily be provided by way of two low-voltage cathode heater windings on leakage reactance transformer LRT.

(b) It is noted that the ratio between the peak magnitude and the minimum-level magnitude (i.e., the magnitude of the plateaus between "bumps") of the DC voltage of FIG. 2c is in effect determined by the ratio of the magnitudes of the lamp's ignition voltage and operating voltage. For a single Instant-Start fluorescent lamp, this ratio might be as high as four-to-one; for a single Rapid-Start fluorescent lamp, the ratio is apt to be just a little higher than two-to-one; for two series-connected Rapid-Start lamps using conventional starting-aid means, the ratio is more like three-to-two.

(c) The degree of intermittent conduction provided by control transistor Qc will determine the degree of discharging of auxiliary capacitor AC resulting from a given magnitude of current through the primary winding of control current transformer CCT. By suitable choice of transistor, this degree of discharging can be so arranged as to be roughly proportional to the magnitude of the load current; which means that the degree of inverter frequency adjustment will then be dependent upon the magnitude of the load current drawn from main output terminals MOT1/MOT2: the higher the output current magnitude, the lower the inverter frequency.

(d) In the circuit arrangement of FIG. 1, the lamp's ignition voltage will always be magnitude-limited by the peak magnitude of the full-wave-rectified power line voltage: which therefore, in effect (for a given turns-ratio and output inductance of leakage reactance transformer LRT), determines the magnitude of the lamp ignition voltage. On the other hand, the magnitude of the lamp's operating voltage determines the DC voltage magnitude to which the energy-storing capacitor ESC charges. Thus, in the DC voltage depicted by FIG. 2c, the ratio between the magnitude of the peaks and that of the "plateaus" is a reflection of the ratio between the magnitude of the lamp's ignition voltage and its operating voltage.

(e) As would be readily understood by a person possessing ordinary skill in the art pertinent hereto, in FIG. 1, the inverter's output voltage is applied in such manner as to series-excite the tuned L-C circuit consisting of the leakage inductance of main secondary winding MSW and tank-capacitor TC.

Thus, the indicated inverter loading circuit manifestly represents a situation of a tuned L-C circuit series-excited by a voltage source and parallel-loaded by a gas discharge lamp.

(f) A leakage reactance transformer, such as LRT of FIG. 1, may be represented by an ideal (voltage) transformer having an inductance of substantive magnitude (the leakage inductance) connected in series with its output terminals.

(g) It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. An arrangement comprising:
   a source of AC voltage;
   rectifier means connected with the source of AC voltage and operative to provide a first unidirectional current to a pair of DC terminals, there being a main DC voltage present across the DC terminals;

inverter means connected with the DC terminals and operative to provide a high-frequency voltage at a high-frequency output, the frequency of the high-frequency voltage being substantially higher than that of the AC voltage;

tuned L-C circuit means connected with the high-frequency output and operative to provide a high-frequency current at a pair of load terminals;

lamp load means connected with the load terminals, the lamp load means being operative: (i) during certain periods to draw a certain amount of power from the load terminals; and (ii) during certain other periods to draw substantially less than said certain amount of power from the load terminals; and power feedback means connected in circuit between the high-frequency output and the DC terminals, the power feedback means including a source of auxiliary DC voltage and being operative therefrom to provide a second unidirectional current to the DC terminals, thereby to cause the instantaneous absolute magnitude of the main DC voltage to be approximately equal to the larger of: (i) the instantaneous absolute magnitude of the AC voltage; and (ii) the instantaneous absolute magnitude of the auxiliary DC voltage;

the arrangement being operative to cause the instantaneous absolute magnitude of the auxiliary DC voltage to be: (i) substantially lower than the peak absolute magnitude of the AC voltage during said certain periods; and (ii) substantially equal to the peak absolute magnitude of the AC voltage during said certain other periods.

2. The arrangement of claim 1 wherein, during said certain periods, the instantaneous absolute magnitude of the auxiliary DC voltage is equal to about half the peak absolute magnitude of the AC voltage.

3. The arrangement of claim 1 wherein the lamp load means comprises a gas discharge lamp.

4. The arrangement of claim 1 wherein the tuned L-C circuit has a natural resonance frequency about equal to the frequency of the high-frequency voltage.

5. In a ballasting means for a gas discharge lamp, the ballasting means being operative to power the gas discharge lamp with a high frequency voltage derived from a source of DC voltage by way of inverter means and applied to the gas discharge lamp by means of a tuned L-C circuit, the magnitude of the high-frequency voltage applied to the gas discharge lamp being higher before the gas discharge lamp has ignited and lower after the gas discharge lamp has ignited, the improvement comprising:

DC voltage control means connected in circuit with the inverter means as well as with the source of DC voltage, this DC voltage control means being operative to cause the magnitude of the DC voltage to be: (i) substantially constant at a maximum level before the gas discharge lamp has ignited, and (ii) varying between this maximum level, and a lower level after the gas discharge lamp has ignited, the ratio between the maximum level and the lower level being substantially equal to the ratio between the magnitude of the high-frequency voltage present across the gas discharge lamp before it has ignited and the magnitude of the high-frequency voltage present across the gas discharge lamp after it has ignited.

6. An arrangement comprising:

a source of primary AC voltage; the source having control means operative on receipt of a control action to change the frequency of the primary AC voltage;

leakage reactance transformer means having a primary winding and a secondary winding; the primary winding being connected with the source of AC voltage; a secondary AC voltage being present across the secondary winding; the secondary winding having an internal inductive reactance; a tank capacitor and a gas discharge lamp means being effectively connected in parallel across the secondary winding; the gas discharge lamp means drawing a lamp current; the lamp current having a first magnitude prior to the gas discharge lamp having been ignited and a second magnitude after the gas discharge lamp has been ignited; the second magnitude being substantially larger than the first magnitude; the tank capacitor being operative to resonantly interact with the internal inductive reactance such as to cause the magnitude of the secondary AC voltage to be substantially larger before, as compared with after, the gas discharge lamp has been ignited; and sensor means responsive to the magnitude of the lamp current; the sensor means being connected in circuit with the control means and operative to provide said control action in response to the magnitude of the current flowing through the gas discharge lamp means, thereby to cause the frequency of the primary and secondary AC voltages to change as a function of the magnitude of the lamp current.

7. The arrangement of claim 6 wherein the frequency of the primary AC voltage decreases with increasing lamp current.

8. An arrangement comprising:

inverter means connected with a source of DC voltage and operative to provide an inverter voltage at an inverter output; the inverter voltage having a frequency; the inverter means having a control input and being operative to control this frequency in response to a control signal received at the control input;

gas discharge lamp means having lamp terminals across which there exists a lamp voltage; the gas discharge lamp being characterized by requiring the lamp voltage to be of a relatively large magnitude for effecting lamp ignition and to be of a relatively low magnitude for effecting proper lamp operation; a lamp current flowing through the gas discharge lamp means;

circuit means connected with the inverter output and operative to supply, from the inverter voltage, the lamp voltage and current to the lamp terminals; and sensor means connected in circuit between the gas discharge lamp means and the control input; the sensor means being responsive only to the magnitude of the lamp current and operative to provide the control signal in response to this magnitude; thereby to cause the frequency to change in response to a change in the magnitude of the lamp current.

* * * * *